US011356438B2

(12) United States Patent
Wang et al.

(10) Patent No.: US 11,356,438 B2
(45) Date of Patent: Jun. 7, 2022

(54) ACCESS MANAGEMENT SYSTEM WITH A SECRET ISOLATION MANAGER

(71) Applicant: MICROSOFT TECHNOLOGY LICENSING, LLC, Redmond, WA (US)

(72) Inventors: Chuang Wang, Issaquah, WA (US); Brian Scott Lounsberry, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 16/674,907

(22) Filed: Nov. 5, 2019

(65) Prior Publication Data
US 2021/0136053 A1 May 6, 2021

(51) Int. Cl.
*H04L 29/00* (2006.01)
*H04L 9/40* (2022.01)

(52) U.S. Cl.
CPC .......... *H04L 63/083* (2013.01); *H04L 63/102* (2013.01)

(58) Field of Classification Search
CPC ... H04L 63/062; H04L 63/083; H04L 63/102; H04L 63/10
See application file for complete search history.

(56) References Cited

U.S. PATENT DOCUMENTS

| 9,563,757 B1 | 2/2017 | Boyer et al. | |
| 9,967,292 B1* | 5/2018 | Higgins | H04L 63/0218 |
| 10,027,658 B1* | 7/2018 | Schwarz | H04L 63/083 |
| 2006/0159268 A1* | 7/2006 | Jung | H04L 63/0869 380/270 |
| 2007/0005989 A1* | 1/2007 | Conrado | G06F 21/6254 713/189 |
| 2008/0098120 A1* | 4/2008 | Johnson | H04L 63/062 709/229 |

(Continued)

FOREIGN PATENT DOCUMENTS

WO    2014036977 A1    3/2014

OTHER PUBLICATIONS

"International Search Report and Written Opinion Issued in PCT Application No. PCT/US20/057580", dated Feb. 3, 2021, 10 Pages.

*Primary Examiner* — Don G Zhao
(74) *Attorney, Agent, or Firm* — Shook, Hardy & Bacon L.L.P.

(57) ABSTRACT

Methods, systems, and computer storage media for providing identification of secrets as one-way secrets in a computing environment. In particular, a secret isolation manager of an access management in the computing environment can identify an entity as an owner of secrets in a secret storage structure. In operation, the secret isolation manager, can receive a request, associated with a requesting entity, to access a secret associated with an approving entity. The request can be for an application of the requesting entity to access a secret of the approving entity. The secret isolation manager accesses the secret storage structure that stores affinity identifiers, where an affinity identifier indicates that the requesting entity has a one-way affinity with the approving entity that owns the secret. The one-way affinity operates to allow the approving entity to share the secret with the requesting entity, so the requesting entity is granted access to the secret.

20 Claims, 7 Drawing Sheets

(56) References Cited

U.S. PATENT DOCUMENTS

| | | | | |
|---|---|---|---|---|
| 2010/0064350 A1* | 3/2010 | Dondeti | ............... | H04L 63/102 726/4 |
| 2011/0107102 A1* | 5/2011 | Canard | ............... | H04L 9/3271 713/170 |
| 2012/0066748 A1* | 3/2012 | Vimpari | ............... | H04L 9/321 726/6 |
| 2014/0164774 A1* | 6/2014 | Nord | ............... | G06F 9/00 713/171 |
| 2014/0282016 A1* | 9/2014 | Hosier, Jr. | ............... | H04W 4/08 715/733 |
| 2014/0366099 A1* | 12/2014 | Le Huerou | ............... | H04W 12/06 726/4 |
| 2014/0373170 A1* | 12/2014 | Brudnicki | ............... | G06F 21/6218 726/27 |
| 2015/0373149 A1* | 12/2015 | Lyons | ............... | G05B 17/02 709/203 |
| 2016/0104154 A1* | 4/2016 | Milov | ............... | G06Q 20/4012 705/67 |
| 2016/0105420 A1* | 4/2016 | Engan | ............... | H04L 63/0815 455/411 |
| 2016/0142758 A1* | 5/2016 | Karp | ............... | G08B 17/10 725/25 |
| 2016/0149869 A1* | 5/2016 | Selander | ............... | H04L 63/0428 713/176 |
| 2017/0331802 A1 | 11/2017 | Keshava et al. | | |
| 2019/0036688 A1* | 1/2019 | Wasily | ............... | H04L 63/0823 |
| 2019/0205898 A1* | 7/2019 | Greco | ............... | G06Q 20/3829 |
| 2019/0286812 A1* | 9/2019 | Lounsberry | ............... | G06F 21/10 |
| 2019/0305938 A1* | 10/2019 | Sandberg-Maitland | ............... | H04L 9/321 |
| 2020/0162255 A1* | 5/2020 | Hunt | ............... | G06F 21/31 |
| 2020/0265531 A1* | 8/2020 | Lee | ............... | G06Q 50/184 |
| 2021/0004454 A1* | 1/2021 | Chester | ............... | H04L 63/083 |

* cited by examiner

ACCESS MANAGEMENT SYSTEM WITH A SECRET ISOLATION MANAGER

BACKGROUND

Users often rely on computing resources such as applications and services to perform various computing tasks. Distributed computing environments can support building, deploying, and managing applications and services. Users and enterprises are moving away from traditional computing environments to run their applications and services on distributed computing environments. Distributed computing environments implement security mechanisms (e.g., an access management system with a secret management service) to ensure the security of different types of computing resources in the distributed computing environments.

By way of example, an access management system with a shared secret management service is a critical mechanism that supports protecting secrets in a distributed computing environment. A shared secret management service, which is directly managed by a secret management service team, can specifically support secret access, secret management, and secret isolation. For example, a secret management service team can process a request from a deployment management system to deploy a secret to virtual machine (VM) of an application, when the application is configured to access the secret. However, existing access management systems are limited in their capacity to support and maintain secret isolation, especially in collaboration scenarios with cross-team (or cross-user) sharing of secrets. Moreover, conventional access management systems do not provide adequate self-service features for secret sharing, where the self-service features simplify processing access requests and reduce manual approvals and human errors. As distributed computing environments increasingly support applications and services, it is important to provide secure secret management for different types of secrets management scenarios while using efficient self-service interfaces.

SUMMARY

Various aspects of the technology described herein are generally directed to systems, methods, and computer storage media, for among other things, providing identification of secrets as one-way secrets (i.e., one-way secret access control for isolation) in a distributed secret management service and providing a self-service interface (i.e., delegation of access management) for managing access requests associated with one-way secret isolation in a computing environment (e.g., a distributed computing environment. In particular, a secret isolation manager of an access management system in the computing environment can identify an entity as an owner of secrets in a secret storage structure (e.g., hierarchical file system structure). Based on the entity being the owner of the secrets, a secret is tagged with a one-way affinity identifier (e.g., affinity ID or friendship ID) that indicates that the secret associated with the owner or tagging entity (e.g., approving entity or TeamB) is one-way accessible by a requester or tagged entity (e.g., requesting entity or TeamA) that requests access to the secret. For example, TeamA's application can have an identifier that is tagged to the secret as an affinity identifier (i.e., affinity ID), such that TeamA's application can have one-way access to TeamB's secret in the secret storage structure. Moreover, the secret isolation manager can provide a self-service interface to support delegation of secret management (including one-way access controls) to computing system entities of requesting teams (or users). For example, TeamA makes a cross-team request for access to TeamB's secret via the self-service interface, and TeamB approves the request or does not approve the request using the self-service interface features.

In operation, the secret isolation manager, can receive a request, associated with a requesting entity, to access a secret, associated with an approving entity. For example, the request can be for an application of the requesting entity to access a secret of the approving entity. The secret isolation manager accesses a secret storage structure that includes secrets tagged with affinity identifiers, where an affinity identifier of a secret indicates that the requesting entity has a one-way affinity with the approving entity that owns the secret. The one-way affinity operates to allow the approving entity to share the secret with the requesting entity. Based on accessing the affinity identifier, the requesting entity is granted access to the secret.

In addition, a self-service interface can be configured to access, from the approving entity, a selection of an identified secret to be shared with the requesting entity. The selection of the secret and the requesting entity are communicated to cause the identified secret to be tagged with an affinity identifier of the requesting entity. Based on tagging the secret with an affinity identifier of the requesting entity, an indication is communicated, via the self-service interface, that the requesting entity has access to the identified secret. The self-service interface is integrated with a distributed secret management service in a distributed computing environment such that a plurality of interface elements of the self-service interface are retrieved (e.g., variables for fields in self-service interface) from the distributed secret management service. For example, team names, types of secrets, and types of resources associated with a user or a team can be populated or made accessible via the self-service interface.

The operations of the secret isolation manager ("secret isolation operations") and additional functional components are executed as an algorithm for performing the specific functions for access management with secret isolation. In this way, the secret isolation operations support securely providing access secrets, while avoiding risk exposure, lack of context, and manual approvals of conventional solutions. The secret isolation operations further support efficiently delegating secret management to distributed computing entities via efficient self-service features to limit direct secret management via a secret management service team.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
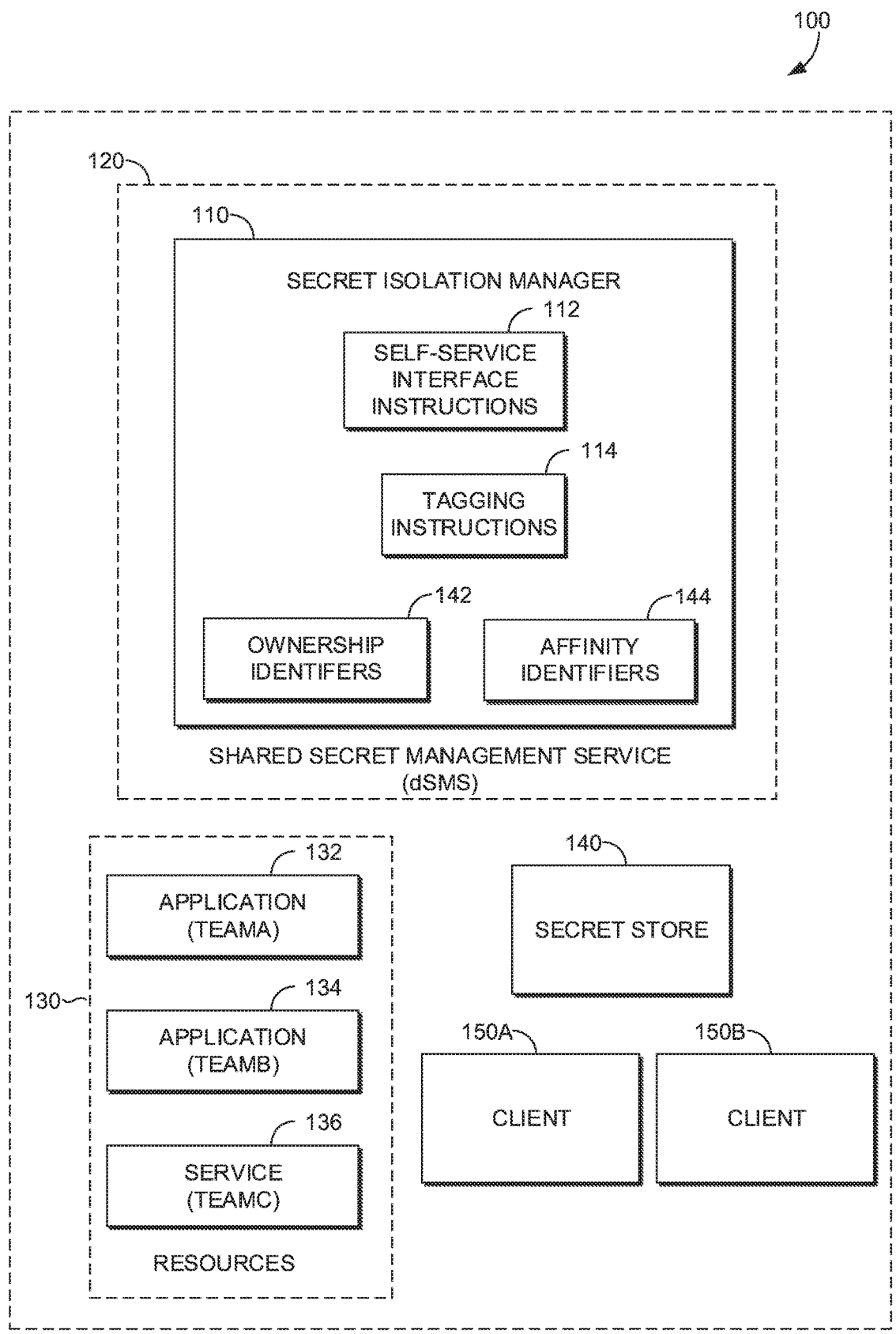
FIG. 1 is a block diagram of an example access management environment for providing secret isolation operations using a secret isolation manager, suitable for use in implementing aspects of the technology described herein.

Overview of Aspects of the Technical Problem, Technical Solution, and Technological Improvement Distributed computing environments implement security mechanisms (e.g., access management systems) to ensure the security of different types of computing resources (e.g., computing access and secure user data) in the distributed computing environments. For example, secrets in computing systems can be used to create secured connections to a server via the internet and secure communications between computing devices. Distributed computing systems may be secured based on secrets such as certificates, passwords, storage account keys, shared access signatures (SAS), and the like. Distributed computing systems implement secret management (e.g., periodically rollover of secrets) to ensure the security of communications and computing devices in the distributed computing system. For example, a distributed computing system can implement a distributed secrets management service (dSMS) that manages certificates that are rotated on host machines and virtual machines in the distributed computing system as detailed in U.S. patent application Ser. No. 15/920,832, filed Mar. 14, 2018, entitled "AUTONOMOUS SECRETS RENEWAL AND DISTRIBUTION", which is herein incorporated by reference in its entirety.

A dSMS that operates as a shared secret service stores and manages the life cycle of secrets on behalf of customers. For example, applications often require access to small pieces of sensitive data (i.e., secrets) at build or run time. In particular, secrets can grant access to additional data (e.g., user data). dSMS manages security concerns around authorization, verification of usage, encryption, rotation, and isolation. Isolation can generally include separation between where secrets are managed versus where they are used. Isolation can also apply to separation of duties between users who have the ability to manage secrets versus use secrets. Moreover, secrets stored in the dSMS should ideally be managed by the customer (i.e., delegated secret management) such that a dSMS team is not responsible for managing secrets. For example, a customer (e.g., approving entity) may have secrets that they need another customer (e.g., a requesting entity) to have access to, for a particular operation (e.g., deploying an application on a VM). With a delegated secret management framework the customer can have access to their own secrets for providing access to other customers and setting up policies, while leaving out a team (e.g., dSMS management team) out of the access controls that have been delegated to the customer.

Conventional access management systems that support providing access to secrets lack a simplified implementation of shared secret management that efficiently supports secret management delegation, secret owners, and secret requesters in self-service model. In particular, conventional access management systems (including delegated secret management) are limited in their capacity to support maintaining secret isolation, especially in collaboration scenarios with cross-team (or cross-user) sharing of secrets. For example, conventional delegated secret management can include different features of the delegated secret management. In a first delegated management feature, a file-system-based aspect supports delegated secret management for user access to secrets. For example, the file-system-based framework can include logic and semantics traditionally associated with file systems for use in delegated secret management (e.g., resources are files, locations are paths, paths, and relative paths). As such, a customer may create a root folder with subfolders with access controls and policies associated with those root folders and subfolder for providing access to corresponding secrets in the folders. In a second delegated management feature, a whitelist (e.g., flat list of identifiers) can be used with a combination of manual approval for delegated secret management. Conventional access management can expose the system to additional risks because of limitations in isolating the secret during delegated secret management or the lack of an immediate context for determining owner scenarios compared to requester scenarios when providing access to secrets, and the capacity for fine grained access controls.

Moreover, the conventional access management systems do not provide adequate self-service features for secret sharing, where the self-service features simplify processing access requests and remove manual approval from a secret service management team to reduce human errors. In this way, there are limited mechanisms or safeguards in conventional access management systems for maintaining a minimum acceptable level of secret isolation while delegating secret management to users or teams. As such, an alternative approach for providing access management with delegated secret management for different types of secrets management scenarios while using efficient self-service interfaces would improve computing operations for more secure and efficient application of network access policies.

Embodiments of the present invention are directed to simple and efficient methods, systems, and computer storage media for providing identification of secrets as one-way secrets (i.e., one-way secret access control for isolation) in a distributed secret management service and providing a self-service interface (i.e., delegation of access management) for managing access requests associated with one-way secret isolation in a computing environment. In particular, a secret isolation manager of an access management system in the computing environment can identify an entity as an owner of secrets in a secret storage structure (e.g., hierarchical file system structure). Based on the entity being the owner of the secrets, a secret is tagged with a one-way affinity identifier (e.g., affinity ID or friendship ID) that indicates that the secret associated with the owner or tagging entity (e.g., approving entity or TeamB) is one-way accessible by a requester or tagged entity (e.g., requesting entity or TeamA) that requests access to the secret. For example, TeamA's application can have an identifier that is tagged to the secret as an affinity identifier (i.e., affinity ID), such that TeamA's application can have one-way access to TeamB's secret in a secret storage structure (e.g., a folder of the secret storage structure). Moreover, the secret isolation manager can provide a self-service interface to support delegation of secret management (including one-way access controls) to computing system entities of requesting teams (or users). For example, TeamA makes a cross-team request for access to TeamB's secret via the self-service interface, and TeamB approves the request or does not approve the request using the self-service interface features.

By way of example, an application (TeamA's application) may need access to a secret (Team B's secret). The secret isolation manager can support storing the secret as a secret owned by TeamB while providing the secret to TeamA's application to perform a particular function. dSMS can support secret isolation management of the secret isolation manager including associating TeamA with TeamA's application (e.g., /Service/Portal/App1) and associating TeamB with TeamB's secret (e.g., /TeamB/Certificates/Secret_Certificate.pfx) is owned by TeamB. The secret isolation manger can be configured to determine that the application owned by TeamA is allowed to access the secret owned by TeamB. dSMS implements an affinity identifier (affinity ID) as a one-way affinity on the secret. In this way, a secret can be deployed by TeamA's application if the secret is associated (e.g., tagged) with an affinity ID corresponding to TeamA. In addition, the secret can be accessed by TeamB (e.g., deployed by an application of TeamB) because TeamB owns the secret (e.g., an Ownership ID tagged to the secret). As such, the secret isolation manager supports one-way secret access controls based on ownership of a secret (e.g., on Ownership ID) and an approved one-way affinity with the secret (e.g., an affinity ID).

Figure 2:
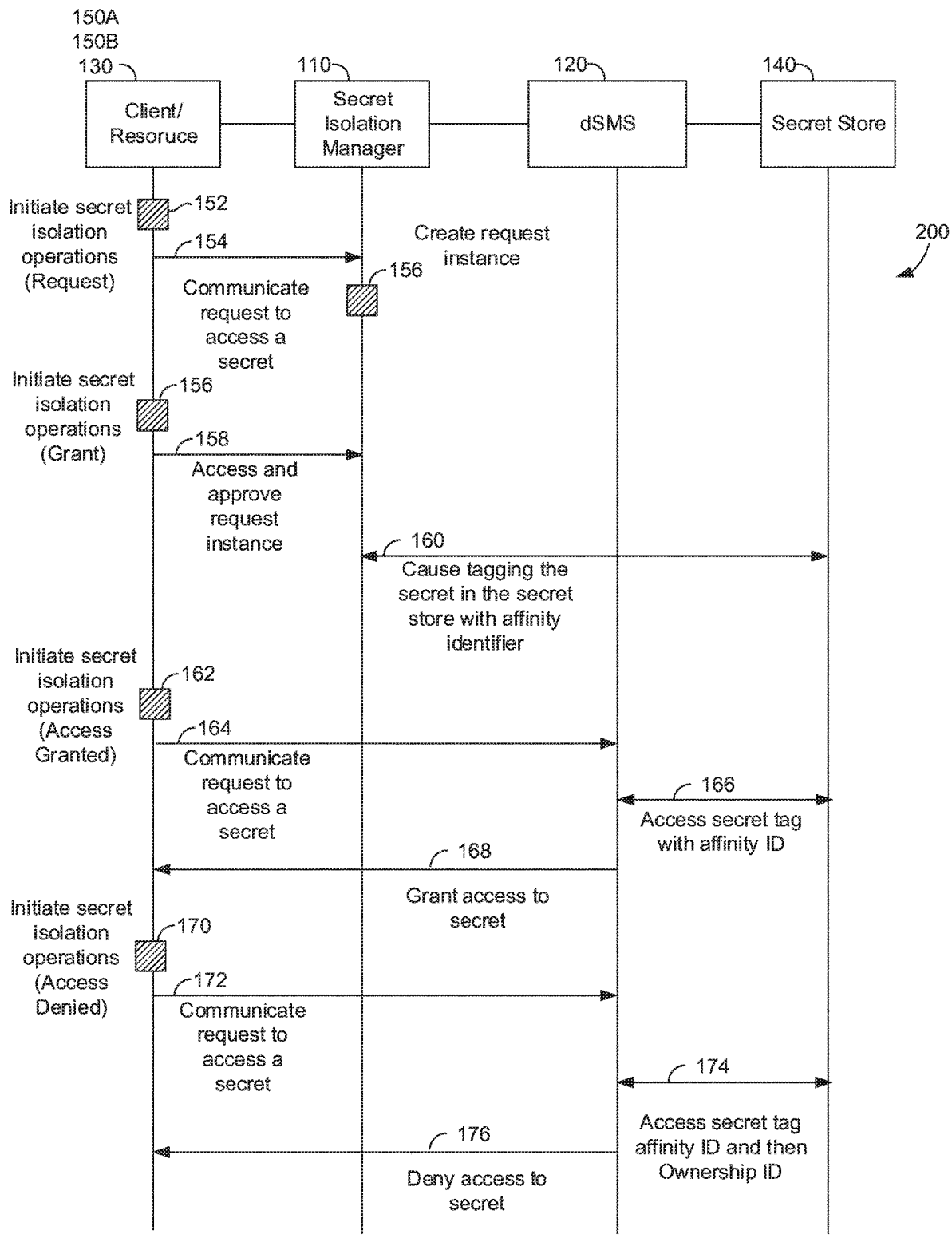
FIG. 2 is an example access management environment for providing secret isolation operations in accordance with aspects of the technology described herein.

Overview of Example Environments for Providing Secret Isolation Operations Using a Secret Isolation Manager Aspects of the technical solution can be described by way of examples and with reference to FIG. 1 and FIG. 2. FIG. 1 and FIG. 2 are associated with an exemplary technical solution environment (access management environment 100) suitable for use in implementing embodiments of the technical solution. Generally, the technical solution environment includes a technical solution system suitable for providing secret isolation operations based on a secret isolation manager. With initial reference to FIG. 1, FIG. 1 discloses access management environment 100, secret isolation manager 110, tagging instructions 114, shared secret management service (dSMS 120), resources 130 (including application (TeamA) 132, application (TeamB) 134, and service (TeamC) 136), secret store 140, ownership identifiers 142, affinity identifiers 144, and client 150.

An access management system (e.g., access management environment) can include a shared secret management service (e.g., dSMS) that supports managing shared secrets. Secrets can be stored in a secret store (e.g., secret store 140) such that resources (e.g., application (TeamA) 132, application (TeamB) 134, and service (TeamC) 136) are provided access to secrets for performing tasks. The secrets can specifically be stored in a hierarchical file system structure. In particular, a customer (e.g., TeamA or TeamB) may set up a root folder having subfolders to store one or more secrets. The folders can be associated (e.g., tagged) with identifiers (e.g., ownership ID or affinity ID) to support the functionality described herein. The hierarchical file system structure of the secret store can be used to tag folders or specific secrets with identifiers to support fine grained access for the particular secrets. The identifiers can be a subscription identifier associated with how the distributed computing environment uniquely identifies a particular entity or computing environment for provisioning resources in the distributed computing environment. dSMS may also use the identifiers to associating applications and services in the distributed computing environment to particular customers (e.g., TeamA, TeamB, and TeamC).

The secret isolation manager 110 can include tagging instructions 114 for providing one-way access controls in the access management system. In particular, the tagging instructions can support tagging a secret with an owner identifier (e.g., ownership identifiers 142) and tagging a secret with an affinity identifier (e.g., affinity identifier 144). For example, a secret can be tagged with an ownership ID of TeamB based on TeamB having a folder containing the secret, while the secret is tagged with an affinity ID of TeamA based on TeamA being approved by TeamB to have access to the secret. In particular, the self-service interface can be supported by instructions that allow an entity (e.g., TeamA) to request access (e.g., via client 150A) to a secret from an owner (e.g., TeamB) of the secret. The self-service interface can further support TeamB tagging (e.g., via client 150B) their own secret with an identifier (i.e., affinity ID) of a requesting entity (i.e., TeamA).

With reference to FIG. 2, FIG. 2 also discloses access management environment that supports the functionality of the technical solution. The access management environment can have corresponding features and functionality as access management system 100 described herein with reference to FIG. 1.

Initially at step 152, TeamA initiates secret isolation operations, for example, a self-service interface at client 150A to request access to a secret. At step 154, the request (e.g., a request identifying the requester and the secret) is communicated to the secret isolation manager. At step 156, the secret isolation manager 110 creates a request instance such that at step 156, TeamB initiates secret isolation operations, for example, a self-service interface at client 150B to at step 158, access and approve request instance. Based on TeamB approving the request instance, the secret isolation manager, at step 160, tags the secret in the secret store 140 with an affinity ID. The secret corresponds to TeamB based on TeamB owning the secret (e.g., TeamB's secret is tagged with an ownership ID and stored in a folder associated with a root folder of TeamB, managed via dSMS 120).

At step 162, a resource (e.g., TeamA's application 132) initiates secret isolation operations, for example, a request to access a secret of TeamB. At step 164, the request to access the secret is communicated to dSMS 120. At step 166, dSMS accesses the secret and determines that the secret is tagged with an affinity ID of TeamA relative to TeamB that owns the secret. Based on affinity ID, dSMS, at step 168, grants access to the secret. It is contemplated that TeamB's application 134 can request and have access to a secret based on an ownership ID that is tagged to the secret. At step 170, a resource (e.g., TeamC's service 136) initiates secret isolation operations, for example, a request to access a secret of Team. At step 172, the request to access the secret is communicated to dSMS 120. At step 174, dSMS accesses the secret and determines that the secret does not have an affinity ID or ownership ID that is associated with Team. At step 176, dSMS denies access to the secret to TeamC's service Aspects of the technical solution of this disclosure have been described with reference to several inventive features and advantages for providing secret isolation operations that support securely providing access secrets, while avoiding risk exposure, lack of context, and manual approvals of conventional solutions. The secret isolation operations further support efficiently delegating secret management to distributed computing entities via efficient self-service features to limit direct secret management by a secret management service team. Overall, the practical application of aspects of the technical solution described results in improvements based on less CPU computation, smaller memory requirements, increased automation and increased flexibility in access management systems.

Figure 3:
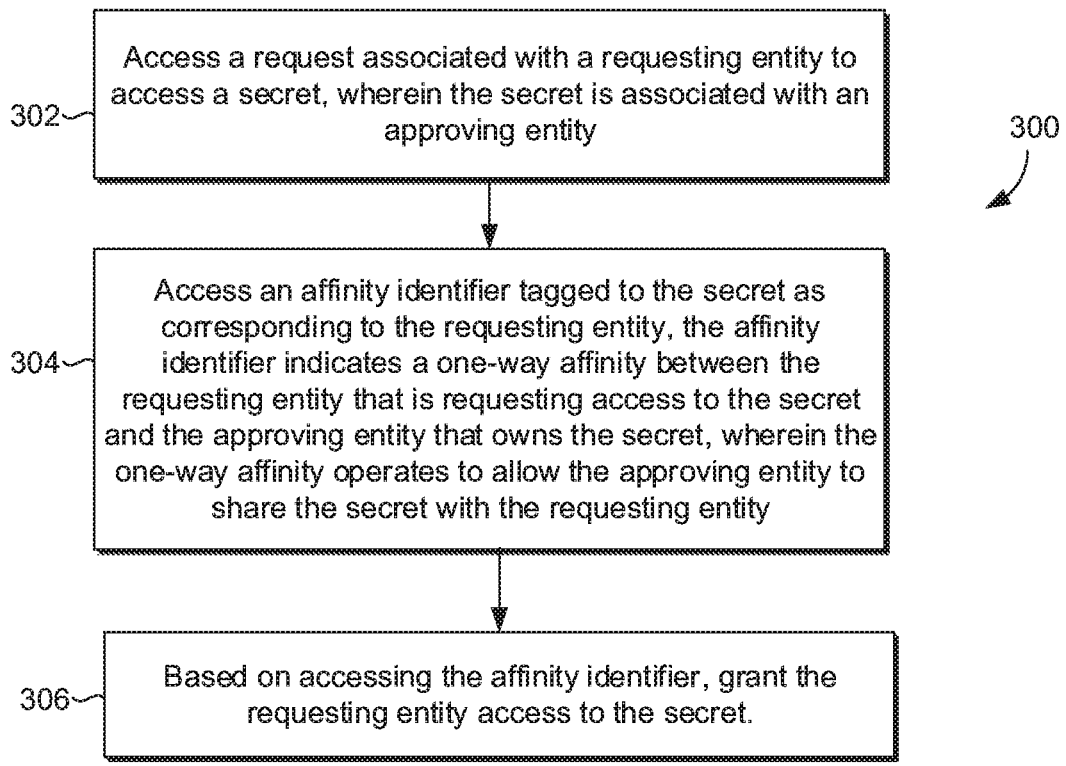
FIG. 3 provides a first example method of providing secret isolation operations, in accordance with aspects of the technology described herein.
Figure 4:
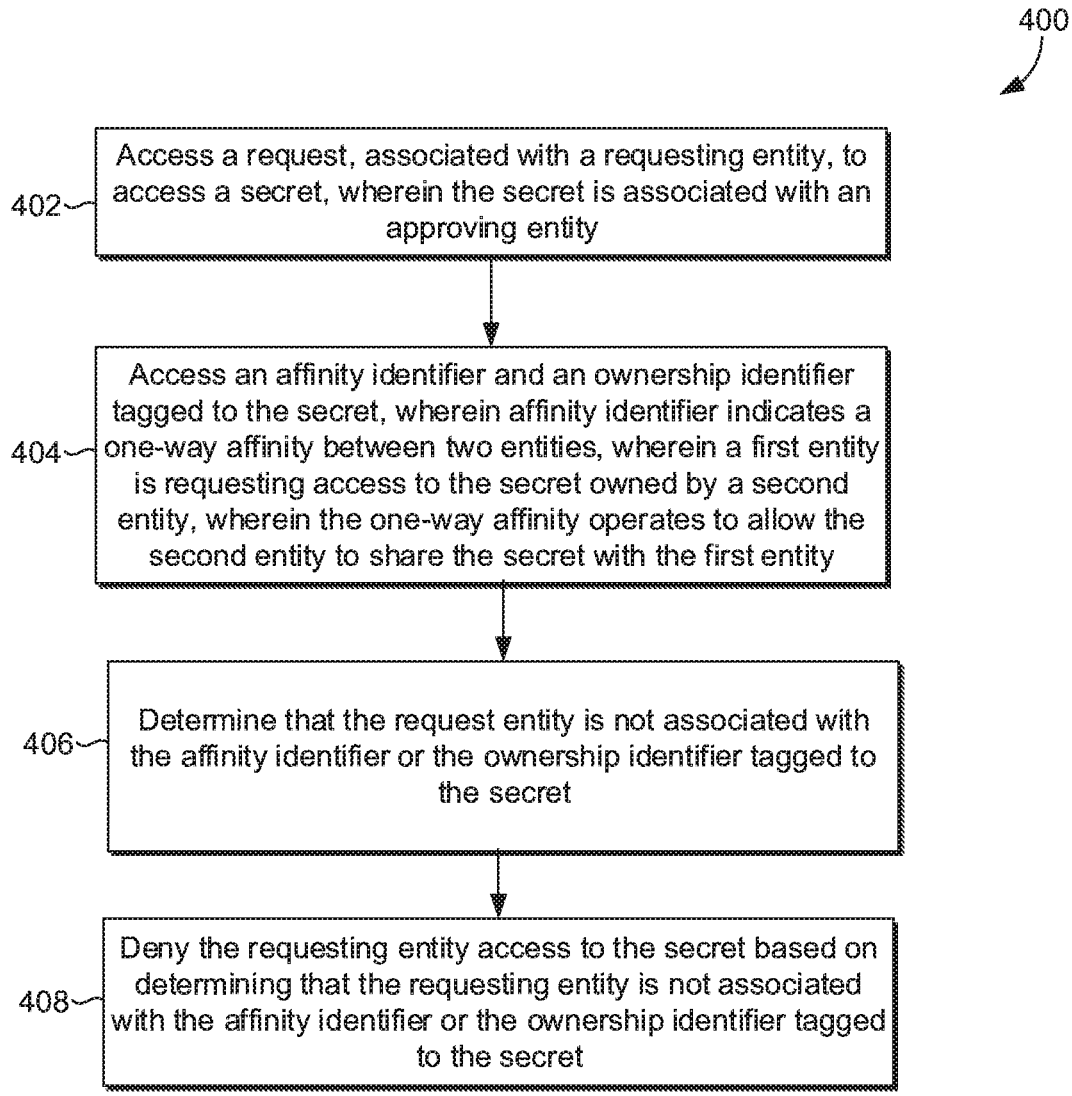
FIG. 4 provides a second example method of providing secret isolation operations, in accordance with aspects of the technology described herein.
Figure 5:
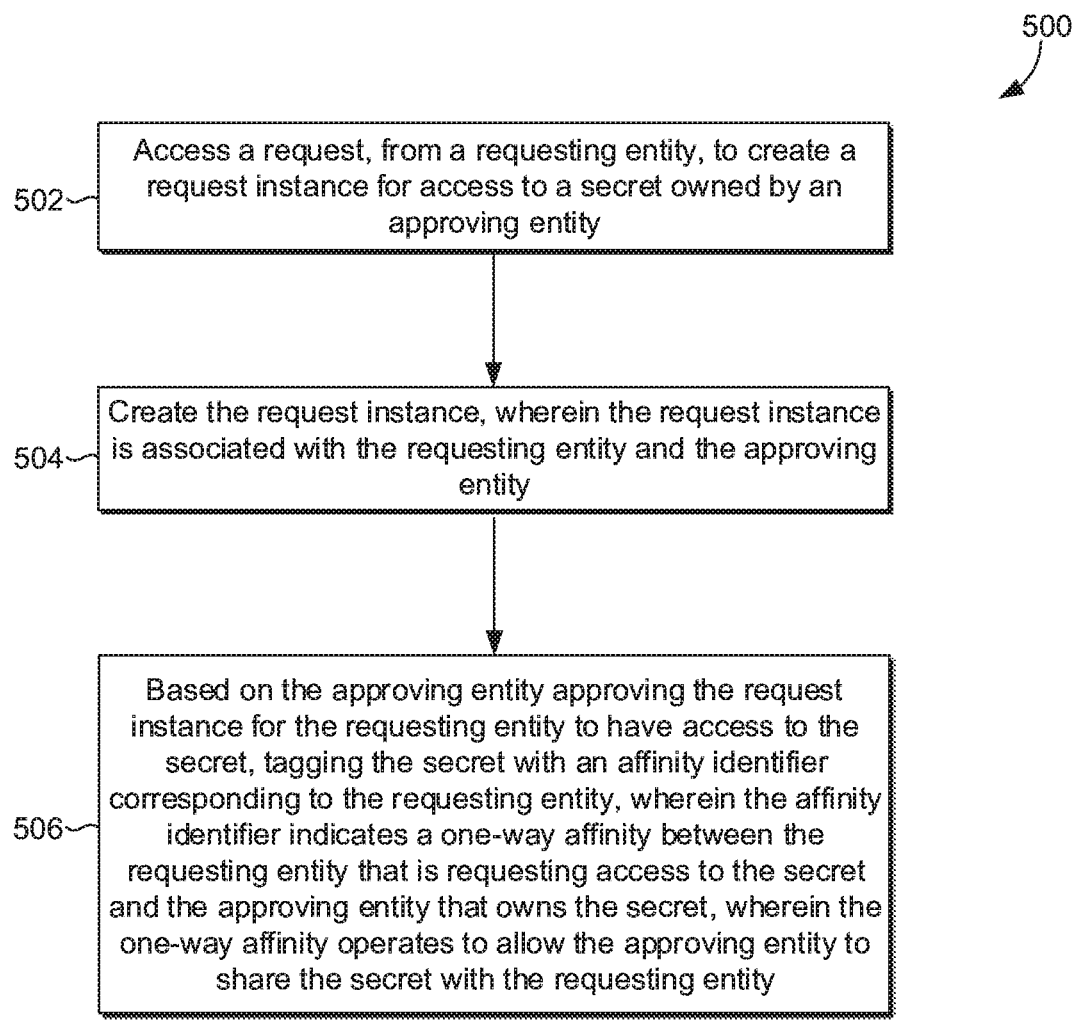
FIG. 5 provides a third example method of providing secret isolation operations, in accordance with aspects of the technology described herein.

Example Methods for Providing Access
Management Based on Secret Isolation Operations With reference to FIGS. 3, 4 and 5, flow diagrams are provided illustrating methods for providing access management based on secret isolation operations. The methods may be performed using the access management environment described herein. In embodiments, one or more computer storage media having computer-executable instructions embodied thereon that, when executed, by one or more processors can cause the one or more processors to perform the methods in the storage system.

Turning to FIG. 3, a flow diagram is provided that illustrates a method 300 for providing secret isolation operations. Initially, at block 302, a request associated with a requesting entity is accessed, the request is a request for access to a secret. The secret is associated with an approving entity. At block 304, an affinity identifier that is tagged to the secret as corresponding to the requesting entity, is accessed. The affinity identifier indicates a one-way affinity between the requesting entity that is requesting access to the secret and the approving entity that owns the secret. The one-way affinity operates to allow the approving entity to share the secret with the requesting entity. At block 306, based on accessing the affinity identifier, the requesting entity is granted access to the secret.

Turning to FIG. 4, a flow diagram is provided that illustrates a method 400 for providing secret isolation operations. Initially at block 402, a request, associated with a requesting entity to access a secret, is accessed. The secret is associated with an approving entity. At block 404, an affinity identifier and an ownership identifier tagged to the secret are accessed. The affinity identifier indicates that a one-way affinity between two entities. A first entity of the two entities is requesting access to the secret owned by a second entity of the two entities. The one-way affinity operates to allow the second entity to share the secret with the first entity. At block 406, a determination is made that the request is not associated with the affinity identifier or the ownership identifier tagged to the secret. At block 408, the requesting entity is denied access to the secret based on determining that the requesting entity is not associated with the affinity identifier or the ownership identifier tagged to the secret.

Turning to FIG. 5, a flow diagram is provided that illustrates a method 300 for providing secret isolation operations. Initially at block 502, a request from a requesting entity is accessed. The request is for creating a request instance for access to a secret owned by an approving entity. At block 504, the request instance is created. The request instance is associated with the requesting entity and the approving entity. Based on the approving entity approving the request instance for the requesting entity to have access to the secret, the secret is tagged with an affinity identifier corresponding to the requesting entity. The affinity identifier indicates a one-way affinity between the requesting entity that is requesting access to the secret and the approving entity that owns the secret. The one-way affinity operates to allow the approving entity to share the secret with the requesting entity.

Example Access Management System

Figure 6:
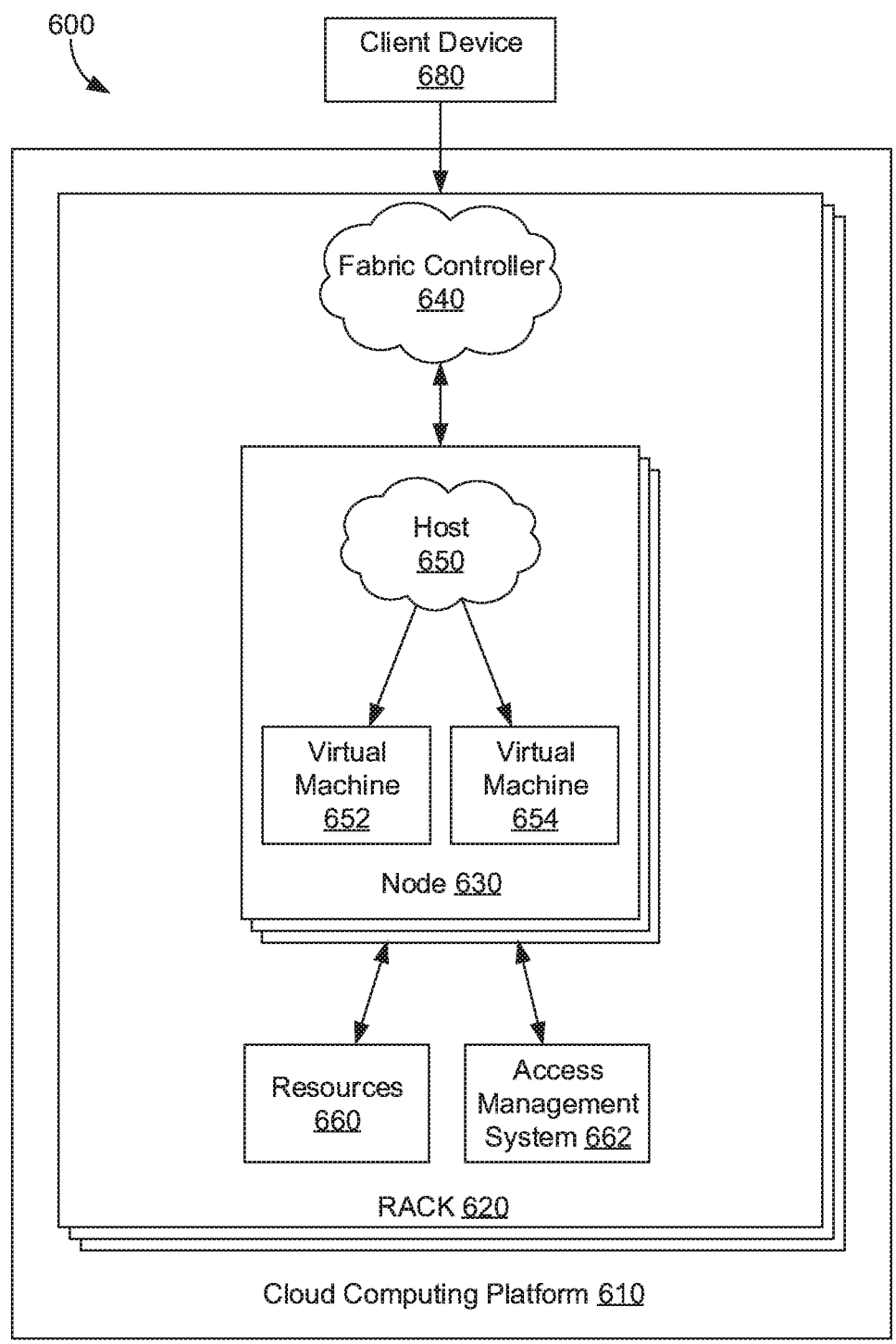
FIG. 6 provides a block diagram of an exemplary distributed computing environment suitable for use in implementing aspects of the technology described herein.

With initial reference the access management system 662 of FIG. 6, at a high level, access management (or access control) can refer to computing security processes and components that provide computer security based on identification, authorization, authentication, access approval and auditing. An access management system can be implemented in a distributed computing environment to limit access to distributed computing environment resources. The access management system can be specifically implemented as a time-limited controlled access management system (e.g., Just-In-Time service). By way of example, a Just-in-Time access management system can be a context-based access management system that provides temporary access to requesters to resources based on security policies. These policies can be designed as an ordered sequence of condition-action rules. When a request is submitted, it is evaluated against applicable rules in sequence and the results of the last matching action are taken to be the result of the policy evaluation. The result involves granting access to a resource with or without human approval or automatically denying the request. The JIT system applies the result and when an access request is granted, JIT system monitors the access and once it expires the access is revoked.

Time-limited controlled access can advantageously be used to lock down inbound traffic to virtual machines to reduce exposure to attacks, while providing easy access to virtual machines when needed. By way of example, when access management is enabled for a resource (e.g., VM) an access management system 662 can lock down inbound traffic to the resource by creating an NSG rule. The resource, for example, may be a VM and selected ports are locked down and controlled using the access management system 662. As such, when a user requests access to a VM, the access management system 662 (e.g., a security center) checks that the user has a role-based access control permission that permits the user to successfully request to access the VM. If the request is approved, the security center can automatically configures a network security group (e.g., NSG) to allow inbound traffic to a selected port and requested source IP addresses or ranges, for the amount of time that was specified. After the time has expired, the security center restores the NSGs to previous states, while keeping the connections that are already established uninterrupted.

The access management system can support different types of policies for controlling access to resources. A VM can be configured to operate with a selected policy or group of policies. In an example implementation, when a VM is enabled for access management, the access management system 662 can create a "deny all inbound traffic" for selected ports; however other manual port settings can also be configured. When requesting access to a VM, a user may identify the ports that the user wants to open and the source IP addresses that the port is opened on and the time window for which the port will be open. The access management system 662 may support requesting access to the ports that are configured in the policy. It is contemplated that each port may have a maximum allowed time derived from the policy.

The access management system 662 can further support auditing access activity by way of a log search. Permissions can be configured to limit access to configuring and use of the access management system 662. The access management system 662 can also optionally be configured programmatically. For example, REST APIs can be used to programmatically get information about configured VMs, add new ones, request access to a VM, and more.

Example Distributed Computing Environment

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610 and an access management system 662 (e.g., access control manager). It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 700 described with reference to FIG. 7, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Operating Environment

Figure 7:
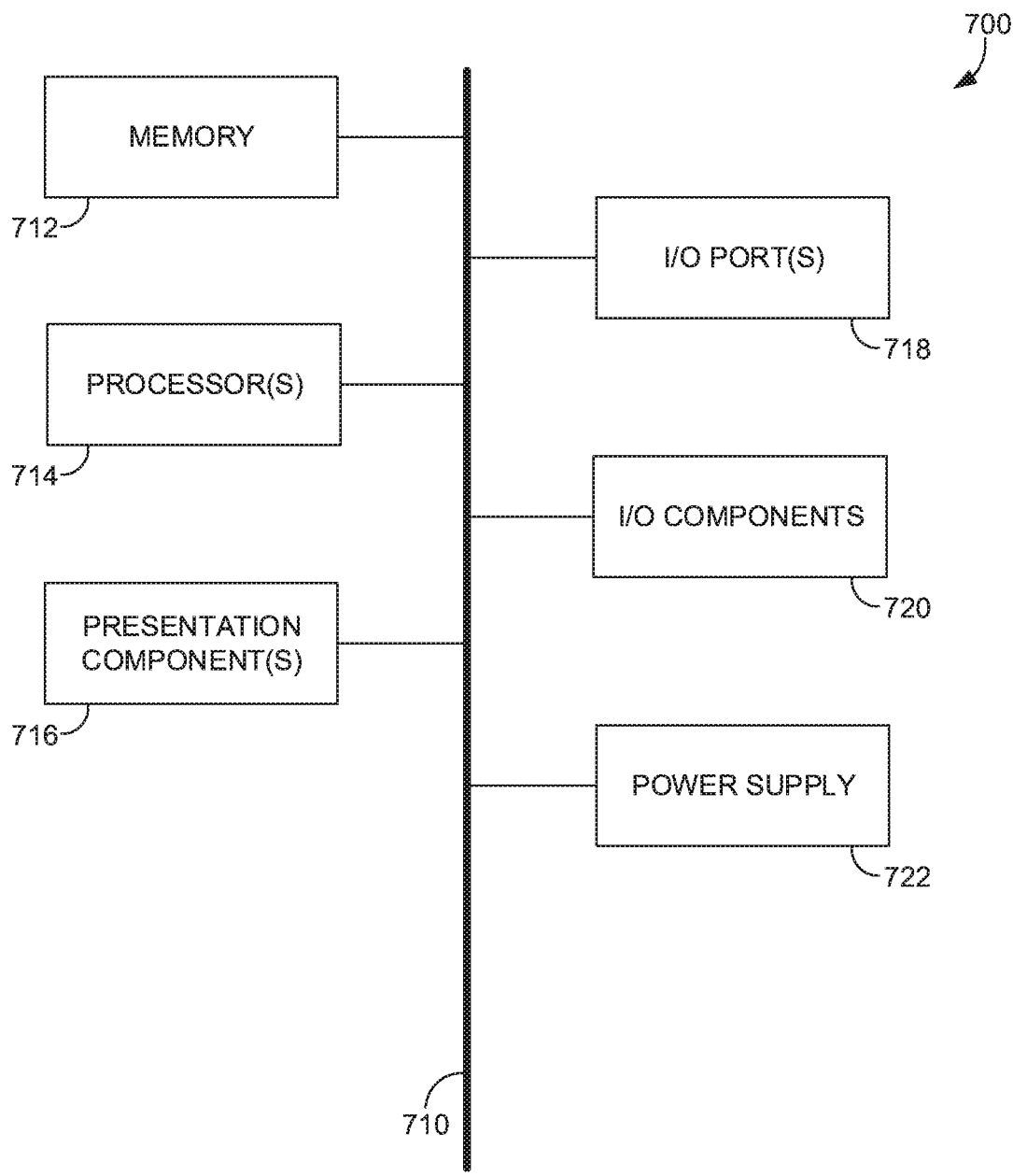
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
accessing a request associated with a requesting entity to access a secret, wherein the secret is associated with an approving entity;
accessing an affinity identifier tagged to the secret as corresponding to the requesting entity, wherein the affinity identifier indicates a one-way affinity between the requesting entity that is requesting access to the secret and the approving entity that owns the secret, wherein the one-way affinity operates to allow the approving entity to share the secret with the requesting entity; and
based on accessing the affinity identifier, granting the requesting entity access to the secret.

2. The system of claim 1, wherein the secret is tagged with an ownership identifier of the approving entity, wherein based on the ownership identifier, the approving entity is granted access to the secret.

3. The system of claim 1, wherein the request is associated with a resource of the requesting entity, wherein the resource is an application requesting access to the secret to support performing functionality of the application in a distributed computing environment, wherein the secret is managed using a shared secret management service in the distributed computing environment.

4. The system of claim 1, wherein the affinity identifier and an ownership identifier of the approving entity are stored in a secret storage structure, wherein the secret storage structure, based on the affinity identifier, indicates that the requesting entity has a one-way accessibility to the secret of the requesting entity and simultaneously, based on the ownership identifier, indicates that the approving entity owns the secret.

5. The system of claim 4, wherein the secret storage structure is a hierarchical organization of secrets in a top-to-bottom configuration for fine grained association of the affinity identifier to one or more secrets within the hierarchical organization of the secret.

6. The system of claim 1, further comprising a self-service interface configured to:
access, from the approving entity, a selection of an identified secret to be shared with the requesting entity;
communicate the selection of the secret and the requesting entity to cause the identified secret to be tagged with the affinity identifier of the requesting entity; and
based on tagging the secret with the affinity identifier of the requesting entity, communication an indication via the self-service interface that the requesting entity has access to the identified secret.

7. The system of claim 6, wherein the self-service interface is integrated with a distributed secret management service in a distributed computing environment, wherein a plurality of interface elements of the self-service interface are retrieved as variables from the distributed secret management service.

8. One or more computer-storage media having computer-executable instructions embodied thereon that, when executed by a computing system having a processor and memory, cause the processor to:
access a request associated with a requesting entity to access a secret, wherein the secret is associated with an approving entity;
access an affinity identifier tagged to the secret as corresponding to the requesting entity, wherein the affinity identifier indicates a one-way affinity between the requesting entity that is requesting access to the secret and the approving entity that owns the secret, wherein the one-way affinity operates to allow the approving entity to share the secret with the requesting entity; and
based on accessing the affinity identifier, grant the requesting entity access to the secret.

9. The media of claim 8, wherein the secret is tagged with an ownership identifier of the approving entity, wherein based on the ownership identifier, the approving entity is granted access to the secret.

10. The media of claim 8, wherein the request is associated with a resource of the requesting entity, wherein the resource is an application requesting access to the secret to support performing functionality of the application in a distributed computing environment, wherein the secret is managed using a shared secret management service in computing environment.

11. The media of claim 8, wherein the affinity identifier and an ownership identifier of the approving are stored in a secret storage structure, wherein the secret storage structure, based on the affinity identifier, indicates that the requesting entity has a one-way accessibility to the secret of the requesting entity and simultaneously, based on the ownership identifier, indicates that the approving entity owns the secret.

12. The media of claim 11, wherein the secret storage structure is a hierarchical organization of secrets in a top-to-bottom configuration for fine grained association of the affinity identifier to one or more secrets within the hierarchical organization of the secret.

13. The media of claim 8, further comprising a self-service interface configured to:
   access, from the approving entity, a selection of an identified secret to be shared with the requesting entity;
   communicate the selection of the secret and the requesting entity to cause the identified secret to be tagged with the affinity identifier of the requesting entity; and
   based on tagging the secret with the affinity identifier of the requesting entity, communication an indication via the self-service interface that the requesting entity has access to the identified secret.

14. The media of claim 13, wherein the self-service interface is integrated with a distributed secret management service in a distributed computing environment, wherein a plurality of interface elements of the self-service interface are retrieved as variables from the distributed secret management service.

15. A computer-implemented method, the method comprising:
   access a request associated with a requesting entity to access a secret, wherein the secret is associated with an approving entity;
   access an affinity identifier tagged to the secret as corresponding to the requesting entity, wherein the affinity identifier indicates a one-way affinity between the requesting entity that is requesting access to the secret and the approving entity that owns the secret, wherein the one-way affinity operates to allow the approving entity to share the secret with the requesting entity; and
   based on accessing the affinity identifier, grant the requesting entity access to the secret.

16. The method of claim 15, wherein the secret is tagged with an ownership identifier of the approving entity, wherein based on the ownership identifier, the approving entity is granted access to the secret.

17. The method of claim 15, wherein the request is associated with a resource of the requesting entity, wherein the resource is an application requesting access to the secret to support performing functionality of the application in a distributed the distributed computing environment, wherein the secret is managed using a shared secret management service in computing environment.

18. The method of claim 15, wherein the affinity identifier and an ownership identifier of the approving are stored in a secret storage structure, wherein the secret storage structure, based on the affinity identifier, indicates that the requesting entity has a one-way accessibility to the secret of the requesting entity and simultaneously, based on the ownership identifier, indicates that the approving entity owns the secret.

19. The method of claim 15, wherein the secret storage structure is a hierarchical organization of secrets in a top-to-bottom configuration for fine grained association of the affinity identifier to one or more secrets within the hierarchical organization of the secret.

20. The method of claim 15, the method further comprising:
   accessing, from the approving entity, a selection of an identified secret to be shared with the requesting entity;
   communicating the selection of the secret and the requesting entity to cause the identified secret to be tagged with the affinity identifier of the requesting entity; and
   based on tagging the secret with the affinity identifier of the requesting entity, communicating an indication via the self-service interface that the requesting entity has access to the identified secret.

* * * * *